United States Patent Office.

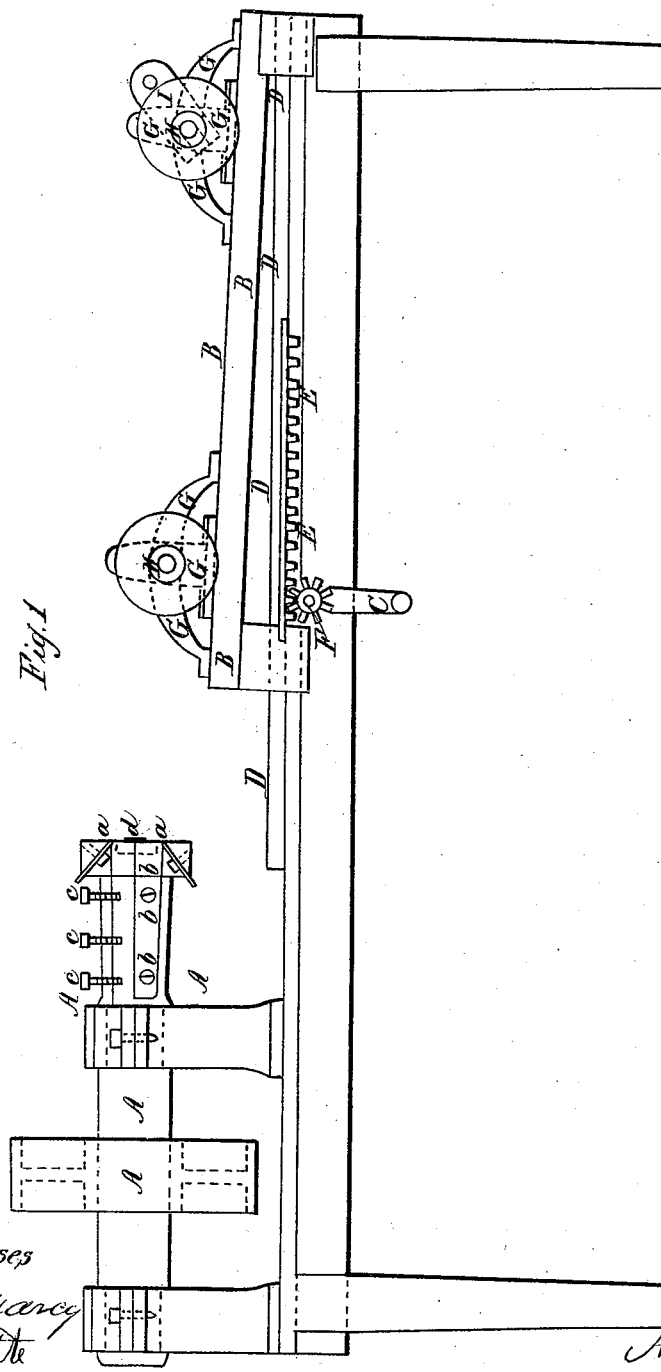

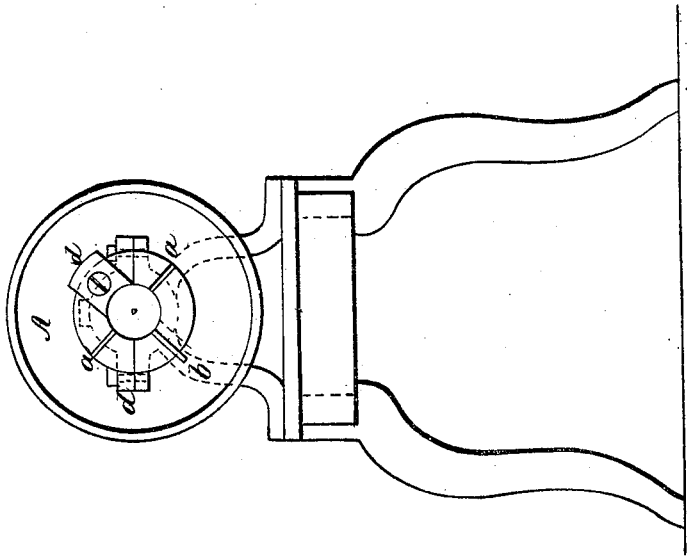
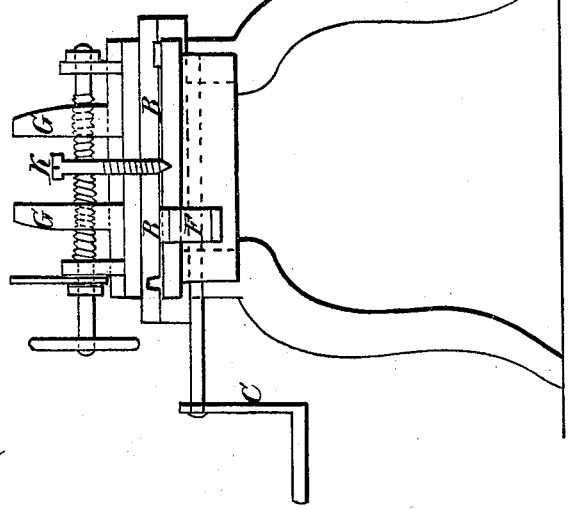

ALBERT BOOTH, OF SPRINGFIELD, ILLINOIS.

Letters Patent No. 91,074, dated June 8, 1869.

IMPROVEMENT IN MACHINE FOR TURNING WAGON-AXLES.

The Schedule referred to in these Letters Patent and making part of the same.

*To all whom it may concern:*

Be it known that I, ALBERT BOOTH, of Springfield, Sangamon county, Illinois, have invented an Improved Machine for Turning and Shaping Axle-Tree Arms; and do hereby declare that the following is a true, full, clear, and exact description of the same, reference being had to the accompanying drawing, making a part of this specification, in which—

Figure 1 is a side view of said improved machine;

Figure 2 is a view of the cutting-end of the mandrel, hereinafter described; and Figure 3 is a view of the rear end of said improved machine, displaying particularly the apparatus for holding and adjusting the axle-trees in the process of turning and shaping the arms thereof.

My invention consists of an improved lathe-head, marked A, consisting of a hollow mandrel of suitable size, operated and made to revolve by a belt encircling a drum upon the mandrel-shaft, which passes through proper supporting-columns, by which belt motion is communicated through steam-power, water-power, or other force.

This mandrel is so constructed and arranged with knives and apparatus for adjustment, connected with said mandrel, and with other parts of said improved machine, that when in motion it will tenon, shape, and cut out axle-tree arms of any required size, at any proper angle, bevel, or slope, and also cut out a proper shoulder to the same, in one operation.

A knife, $b$, of sufficient length, penetrates the wall of the mandrel, with a cutting-edge inward, and is adjustable up and down by means of screws, near each end of it, passing through slots in the same, into the wall of the mandrel, at right angles with the sides of said knife.

Two knives, $a\ a$, pass diagonally through the walls of the mandrel, opposite to each other, and terminate with their cutting-ends on the inside of said mandrel, near the mouth of the cavity thereof, which knives are made adjustable by means of a screw passing through a slot in each into the wall of the mandrel, at right angles with the sides of each of said knives.

A gauge, $d$, is secured upon the front end of said mandrel, and opposite the outer front edge of the knife $b$, and made adjustable by means of a screw passing through a slot in said gauge, at right angles therewith, into the end of the wall of the mandrel.

Three screws $c\ c\ c$ pass through the wall of the mandrel, from outside to inside, as displayed in drawing No. 1, and serve as a support for the axle, and prevent the knife $b$ from chattering.

An opening in the wall of the mandrel longitudinally, extending the length of knife $b$, completes the apparatus connected with the mandrel.

When the mandrel is revolving and in operation, the screws $c\ c\ c$ and the gauge $d$ hold and direct the axle-tree arm as it enters the mandrel, while the knife $b$ shapes it to the desired size and with the proper slope or bevel, and the knives $a\ a$ cut out the shoulder, and the chips fall through the opening in the mandrel.

A sliding carriage, B, with an upward inclination toward the mandrel, is moved back and forth upon the ways D by a crank, C, pinion F, and rack E E, underneath.

Upon this carriage, which feeds the axle-tree up to the mandrel, the axle-tree is confined in place by two sets of clamps, G G, movable laterally to and from a common centre by right and left-hand screws, H H, upon bed-pieces, and adjusted bodily, laterally, by said screws, each having a right and left-hand turn, and passing through each set of clamps from side to side, and supported by proper bearings on each side, outside of said clamps.

The bed-pieces, upon which the rear clamps G G rest, have also a lateral movement.

Upon the screw-shaft, to said rear set of clamps, are two collars, one outside of each bearing, but at a greater distance apart than the outside of said bearings.

There is also a wedge, I, as displayed in drawing No. 1, with a claw.

The turning of the screws H H draws the clamps aforesaid toward or away from each other, as the screw is turned one way or the other, preserving always the same distance from a common centre.

By the use of the wedge I, applied to either end of the rear screw-shaft to said clamps, between the bearing and the collar, on either side, an adjustment of said clamps is effected, which throws them to the right or left of a common centre, and holds them in that position.

The use of this last adjustment is to give proper gather and the right or proper angle laterally to either end of the axle-tree.

Between each set of clamps is a vertical screw, $k\ k$, upon which the axle-tree rests, by raising or lowering which screws, the proper up-and-down pitch is given to the axle-tree.

I am aware of the application of R. H. Albright for Letters Patent for a cutter-head, filed December, 1860, and rejected, and withdrawn May 30, 1861, and do not claim the construction and arrangement of devices as shown by him; but What I do claim, and desire to secure by Letters Patent, is—

The hollow mandrel for turning the ends of axle-trees, when provided with the cutters $a\ a$ and $b$, adjustable gauge $d$, and screws $c\ c\ c$, substantially as and for the purpose herein shown and described.

Also, the carriage B, provided with the adjustable clamps G G, claw-wedge I, and vertically-adjustable screws $k\ k$, substantially as described, and for the purpose set forth.

ALBERT BOOTH.

Witnesses:
GEO. O. MARCY,
WM. WHITE.